Oct. 19, 1943. R. T. ANDERSON 2,331,883
EXPELLER PRESS
Filed Jan. 26, 1940 2 Sheets-Sheet 1
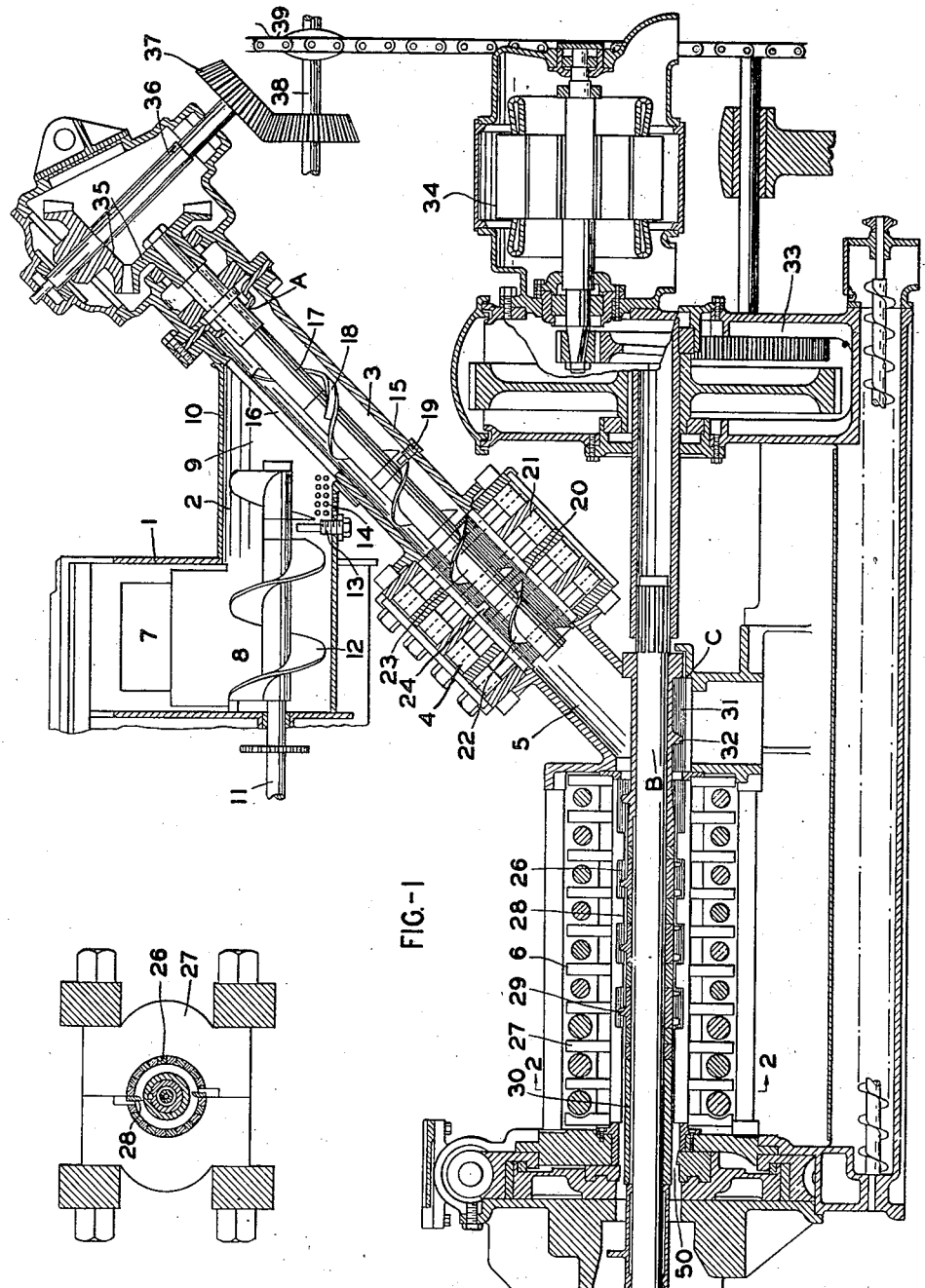
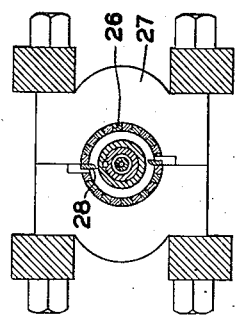
INVENTOR
RAYMOND T. ANDERSON
BY
Hyde and Meyer
ATTORNEYS Oct. 19, 1943.      R. T. ANDERSON      2,331,883
EXPELLER PRESS
Filed Jan. 26, 1940      2 Sheets-Sheet 2
FIG.-3
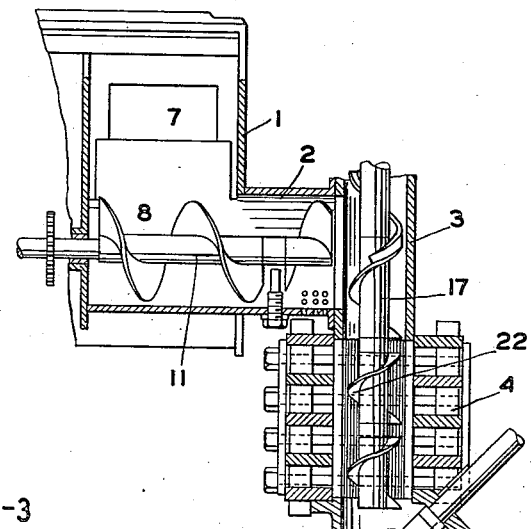
FIG.-4
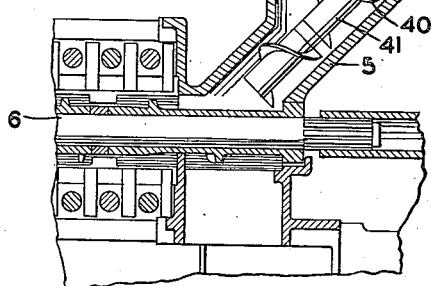
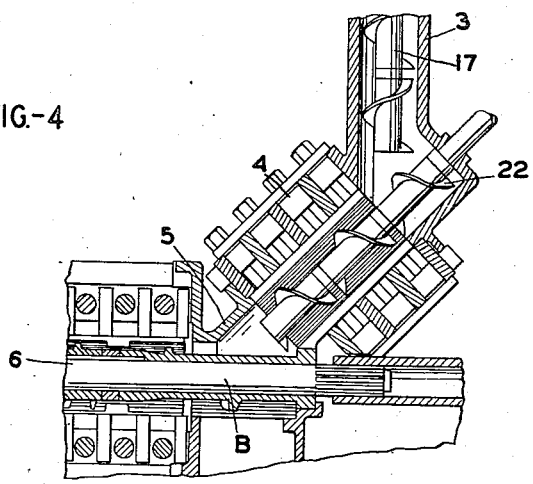
INVENTOR
RAYMOND T. ANDERSON
BY
*Hyde and Meyer*
ATTORNEYS Patented Oct. 19, 1943

2,331,883

UNITED STATES PATENT OFFICE 2,331,883

EXPELLER PRESS

Raymond T. Anderson, Berea, Ohio, assignor to The V. D. Anderson Company, Cleveland, Ohio, a corporation of Ohio Application January 26, 1940, Serial No. 315,659

3 Claims. (Cl. 100—48)

This invention relates to expeller presses of the interrupted worm type, such as are used, for example, for expressing oil from proteinaceous oleaginous material, such as cottonseed, copra, and various nut meats or other material of vegetable origin, and cracklings, or other material of animal origin.

More particularly, the invention relates to screw presses of the general type illustrated in Anderson Patent No. 1,971,632, granted August 28, 1934 for Feeding mechanism for presses, or in my Patent No. 2,275,337 for Expressing of oleaginous material, granted March 3, 1942, to either of which reference may be had for a more complete description and illustration, if necessary or desirable.

In screw presses of this kind the temperature and moisture content of the material being processed, whether it is of animal or vegetable origin, may first be adjusted or standardized in a so-called conditioner, from which it passes to one or more screw elements, which not only convey the material toward the outlet where the compressed more or less solid cake is ejected after extraction of the oil therefrom, but also, by various arrangements and configurations of screw flights, stop devices or abutments, or other suitable devices, such as a choke or restricted outlet, progressively subject the material to increasing pressure and thereby not only express or expel the oil through the openings of the foraminous barrel, but also maintain it compressed and progressively reduce its volume.

The present invention has for its object to provide a novel organization of and relation between preliminary press, feed hopper, feed press, and main press elements, or two or more thereof, each thereof being so constructed and arranged, and all being so related to each other, as to materially improve the operation of the press as a whole, and in particular to increase its efficiency, to reduce wear and tear and breakage of the parts, and lengthen its period of usefulness. Such increase in efficiency not only tends to increase the yield of oil without loss of or reduction in quality, but also reduces the elapsed time per unit of mass of material processed or treated, thereby increasing the over-all yield, production or economy of the machine as a whole.

Still another object of the invention is to improve efficiency and reduce power consumption and wear and tear on the mechanism by a novel relation between succeeding elements of the press, to-wit, one in which a substantial component of the material advancing and compressing force effective in one press element is directly effective to supplement the like force effective upon the material moving through the succeeding press element, being transmitted from element to element at a suitable angle appropriate to that end, such as an obtuse angle, as will appear more fully hereinafter.

A further object is to so angularly relate succeeding elements of the press to each other as to reduce the application of unnecessary or undesirable high pressure or other strain to the screen or drainage barrel, thereby reducing wear and breakage and also avoiding leakage of the material being processed outwardly through joints between moving parts, and thereby reducing the packing requirements for the press.

Still another object is to so arrange the various elements of the press as to simplify the task of external oil cooling of the drainage barrels.

Further objects of the invention are in part obvious and in part will appear more in detail hereinafter.

In the drawings, Fig. 1 is a longitudinal sectional elevation illustrating one suitable embodiment of a press constructed according to my invention; Fig. 2 is a detail cross section thereof on the line 2—2, Fig. 1, looking in the direction of the arrows; Fig. 3 is a detail view corresponding to Fig. 1 and illustrating a modification; and Fig. 4 is a similar view, illustrating still another modification.

Referring now to the drawings, and more particularly to Fig. 1, the press there shown, in a general way, is similar in principle to that forming the subject matter of my aforesaid Patent No. 2,275,337, before referred to. It includes a series of elements through which the material being processed, such as cottonseed, passes in turn from the beginning of the process through the extraction or expulsion of oil from the cottonseed or the like to the ejection of the more or less solid cake. These elements, referring to them generally, include in the order named, the conditioner 1, a preliminary press 2, a feed hopper 3, a feed press 4, a main press supply chute 5 and a main press 6, which will be explained in the order named.

The conditioner 1 may be of any suitable form selected according to the material being processed and the requirements for proper conditioning thereof. The purpose of this conditioner is to more or less standardize the material as to its temperature and moisture content, either subsequently to or as part of a cooking process, where cooking is necessary, so that in any event the material introduced to the first of the series of pressing or expelling elements has uniform characteristics. All material processed in a given run of the press is therefore alike and the ultimate results are uniform.

The conditioner 1 illustrated is of the same general form illustrated in my said prior application, which in detail illustrates agitators for the material arranged to move it along the conditioner and finally eject it from an outlet 7 through which it flows or is delivered to the preliminary press 2. Such operating devices for the conditioner as are necessary or required may be driven from any suitable source, either an independent motor or any suitable part of the press mechanism now to be described.

The preliminary press 2 is the first of the oil expressing or expelling elements. Actually it may be constructed as a part of the conditioner in the sense that its operating worm may be attached to or form a part of the conditioner agitator shaft, as in Fig. 5 of my aforesaid Patent No. 2,275,337. But, as shown, the preliminary press is separate from the conditioner, including walls forming a receiving chamber 8, into which the material flows from the conditioner delivery opening 7, said chamber communicating with the expressing chamber 9 inside of a barrel 10. Within the chambers of the preliminary press is rotatably mounted a shaft 11 on which are mounted a suitable number of worm flights 12 (two thereof being shown) longitudinally spaced or separated from each other and cooperating with suitable stop abutments, such as knives or the screws 13 shown for preventing rotation of the material with the worm flights.

The barrel 10 may be of screen or foraminous type, being suitably formed in any manner to provide small openings through which oil may be expressed. While the barrel 10 may be of spaced parallel bar form, like the barrel of the feed and main presses later to be described, the drawings show barrel 10 as provided with a series of fine openings 14, although the invention is not limited to such arrangement.

Uniform or standardized material delivered to the preliminary press from the conditioner meets the rotating worm of the preliminary press and is advanced and compressed thereby, without rotation on account of the stop abutments 13, until it is finally delivered by the preliminary press into the feed hopper to be described. During its travel through the preliminary press the material is to some extent compacted by subjection to the pressure of the screw and some oil is expelled through the barrel openings 14. The tendency here is to preliminarily reduce the volume of the material, to maintain it compressed and compact it into a more or less solid mass without voids, and to deliver it in uniform smooth flowing condition to the feed hopper, but without unduly raising the pressure upon the material to a value seriously affecting the ability to change the direction of flow of the material or to impose unnecessary strain upon the parts of the feed hopper. Of course, all oil extracted here reduces the labor of succeeding parts of the press and thereby increases their efficiency.

The preliminary press, just described, is so disposed that its worm axis extends horizontally. The feed hopper, now to be described, together with the feed press to follow, extends downwardly although not necessarily vertically. It at least conducts the material to a lower level in the press when the axes of the worms of all press elements are in the same vertical plane, although this is not essential to the invention.

Feed hopper 3 includes a barrel 15 having an opening 16 through which the material is delivered to it from the preliminary press, and in said barrel is mounted a worm shaft 17 having one or more flights 18 longitudinally spaced and separated where desirable by suitable stop abutments, such as the screws 19. The feed hopper may also have its barrel of any suitable foraminous form, like the barrel of the preliminary press, but as shown the barrel of the feed hopper is imperforate, the purpose of said feed hopper being to receive the material from the preliminary press, change the direction of its flow, and to feed or supply it to the feed press now to be described. In the arrangement shown in Fig. 1, the axes of the worms of the preliminary press and feed hopper intersect each other at a point within the receiving portion of the barrel of the feed hopper at an acute angle, to-wit, an angle less than a right angle. But that fact is of no serious import because the pressure upon the material has not yet been materially increased, at least not to such a value as might exert unnecessarily harsh pressure effect upon the foraminous wall of the barrel of the feed hopper (when it is of perforate form) or which might cause leakage of material at the joint between moving parts, such as at the point A, Fig. 1, where the shaft 17 extends through a suitable packing to its driving mechanism, to be described.

In Figs. 3 and 4, however, the axis of the worm of the feed hopper is truly vertical, intersecting the axis of the worm of the preliminary press at a right angle, the purpose of that arrangement being to avoid even such slight loss of efficiency or of power consumption as might be entailed in an acute angle relation between the two shafts, even at low pressure of the material.

Whichever be the arrangement, as in Figs. 1, 3 or 4, the feed hopper, with its worm, serves the purpose of feeding or supplying the material to the feed press now to be described.

The feed press 4 may be any suitable form of screw press adapted for use in processing material of the kind here involved. It is more or less conventionally illustrated as comprising a foraminous barrel 20, made of a series of longitudinally extending parallel heavy bars closely spaced from each other and bound as a unit into cylindrical barrel form by a supporting cage structure 21. Within that barrel is mounted a worm 22 having spaced flights 23 separated by suitable stop abutments to prevent rotation of the material with the worm, and shown as knives 24. In Fig. 1 the shaft of the worm which feeds to the main press is identical with or a continuation of the shaft of the feed hopper, whereas in the arrangement shown in Fig. 4 the shafts of the feed press and feed hopper are separate and independent, either arrangement being contemplated by the present invention.

In the feed press the material being processed is further advanced and is again subjected to increased pressure so that it is further compressed or compacted and additional oil is expressed or expelled through the openings of the foraminous barrel. The solid material remaining after extraction of the oil advances without rotation on account of the stop abutments 24 and is conducted to and delivered into the receiving end of the main press 6. The worm shaft and flights of the feed press may extend clear to the receiving end of the main press, as shown in Fig. 3, or, as shown in Fig. 1, may stop short thereof, so that the material is conducted from the feed press to the main press by and through a conducting chute 5, which is a simple cylindrical casing member, preferably imperforate, although it may be perforated for oil expression, if desired.

Choice between the two constructions enables the press to be accommodated to or adapted for expressing oil from a wide variety of materials differing materially as to their density or oil content or in other characteristics.

The main press 6 may also be of any suitable form for the purpose. It is conventionally shown as of the same form illustrated for the main press in my prior patent and application before referred to, including a foraminous drainage barrel 26, of closely spaced bar form, mounted in a supporting cage 27 and provided with stationary stop abutments 28, of knife form, which prevent rotation of the material with the worm and lie between the flights 29 of the worm shaft 30, which here, as in the press elements of the earlier stages, both advance and compress the material. At the receiving end of the main press its foraminous barrel is extended, as at 31, and the shaft 30 is provided with a continuous extended worm flight 32, the purpose of which is to receive the material from the feed press 4 or chute 5 and advance it to the expressing flights of the main press worm.

It will be observed that the axes of the worms of the main press and feed press are inclined to and intersect each other, at a point B lying within the feed chamber of the main press, at an obtuse angle, to-wit, an angle greater than a right angle and less than 180°. The purpose of that relation between the axes of the two shafts is to simplify the task of changing the direction of flow of the material and to utilize a substantial component of the material feeding and compressing force of the screw of the feeding press for supplementing the like material advancing and compressing effect of the screw of the main press. While the invention is not limited to this particular arrangement, Figs. 1 and 4 of the drawings show the axes of the worms of the feed press and main press inclined to each other at an angle of 135°. When they are so related a component of the material feeding and compressing force effective in the feed press, and theoretically having a value of approximately 70% of that force, is directly effective upon the material moving along in the main press, and to that extent (with due regard for friction loss) supplements the direct feeding and compressing effect of the expressing worm of the main press itself. Obtuse angular relation between the axes of the shafts of the feed press and main press is particularly desirable because by the time the material has reached the entrance to the main press its compression has been very materially increased by the effect of the feed press, and during its passage through the main press its compression is still further increased. So that at the point B the material is under heavy compression and the obtuse angular relation is quite advantageous in changing the direction of flow of the material. For example, the strains and stresses imposed upon the bars of the barrel along the bottom of the receiving chamber of the main press are reduced and the bars have longer life and are not so liable to break. Again, the arrangement described reduces very substantially any tendency of the material to leak or escape outwardly through joints between moving parts, as at the point C where the worm shaft extends out through a packing to its operating mechanism. And, of course, all force of the feed press worm utilized to promote travel and compression of the material in the main press to that same extent reduces the total over-all power load and increases efficiency of the press, as a whole.

In this press, as in many presses of this kind, the driving mechanism is preferably so arranged as to always tend to build up and maintain the pressure upon and compression of the material as it travels through the press. The main press worm 30 is shown as driven by speed reducing gearing 33 from a motor 34. In Fig. 1 the shaft 17 of the feed hopper 3 and feed press 4 is of course angularly disposed and may be driven in any suitable manner. Fig. 1 shows said shaft driven through bevel gears 35 by a shaft 36 connected by bevel gearing 37 to a horizontal shaft 38 on which is a member 39, either a sprocket or gear, adapted for connection to any suitable driver. For example, the driver may be an individual motor (not shown) whose speed may be so varied or adjusted as to always compel the feed press to supply material to the main press as fast as the latter will accept it, or, as in my prior patent referred to, member 39 may be driven from the motor 34 by suitable friction or other variable speed connection by means of which the speed of the feed press is self-accommodating to the speed of the main press.

Where the feed hopper and feed press screws are separate and independent, as in Fig. 4, they may be individually driven by separate motors or either or both thereof may be driven by any suitable operative connection to the mechanism of the main press or to its driving motor, as before described.

In the operation of this press, due to the use of suitable means for the purpose, such as the choke 50 or the configurations of screw flights, stop devices or the like, before referred to, or both, the material being processed, from the time it leaves the conditioner and enters the preliminary press to the time of ejectment of the more or less solid cake through the choke 50, is subjected to a gradual increase in pressure, and to gradually increasing compression, with gradual expulsion or expression of the oil through the openings of the foraminous barrels. The tendency throughout the press is to maintain the material in solid form without voids or open spaces, and always without loss of compression, so that there is no tendency for reabsorption of the oil by the solid matter after it is once expelled. The obtuse angular relationship between any two succeeding elements of the press, such as between the feed hopper and feed press, in Fig. 4, or between the feed press and main press, as in either Fig. 1 or Fig. 4, reduces the overall consumption of power, increases efficiency, avoids wear and tear and breakage, and accomplishes all of this without sacrifice in quality of oil.

In the arrangements shown in each of Figs. 1 and 4, the axis of the feed press worm is inclined to the axis of the main press worm, but the two arangements differ in that in Fig. 1 the axis of the feed hopper and feed press are identical, whereas in Fig. 4 they are independent and inclined to each other as are the feed press and main press.

Fig. 3 shows still another arrangement in which the axis of the worm of the preliminary press is again horizontal, that worm feeding the material to a vertical feed hopper, whose barrel may be perforate or imperforate, and which feeds the material downwardly to a feed press 4, whose axis is vertical. The arrangement differs from those shown in other views, however, by reason of the change of direction of flow of the material where it moves from the feed press 4 into the conducting chute 5, and from the latter into the barrel of the main press. The conducting chute 5 here is provided with a rotating worm or screw 40 on a shaft 41, similar to those before described, and the axis of which is inclined at an angle of 135° to the axis of each of the feed press and the main press. A component of the material advancing and compressing force effective in the feed press, with a value of approximately 70% of that force (neglecting friction loss), is therefore effective in the conducting chute 5 to supplement the action of its screw 40, and likewise, a similar component of the force of the screw 40 is effective in the barrel of the main press. In this form barrel 5 may be either imperforate or perforate, as desired.

In all arrangements external cooling of the working parts of the press is simplified, because it is always found easier to externally oil cool a press barrel which occupies a position other than vertical, to-wit, either horizontal or inclined to the horizontal. When the barrels are so disposed, oil can be rained down upon them by gravity and the oil also flows readily from one press barrel downwardly to another barrel beneath it. It is therefore unnecessary to apply cooling oil in spray form with the possibility of clogging of spray nozzles or the introduction of other influences reducing efficiency.

What I claim is:

1. A continuous screw press, comprising a plurality of press elements arranged in tandem with the discharge end of one element in open communication with the receiving end of the next element, each of said elements including a barrel, a constantly rotating material advancing screw therein, and means arranged to compel said screw to exert increasing pressure upon the material and maintain it compressed as it travels through the press, thereby to express liquid from the material, the axes of the screws of said elements being inclined to each other and intersecting at an obtuse angle, whereby a component of the material advancing and compressing force of the rotating screw operative in one element supplements the like force of the rotating screw in the succeeding element.

2. A continuous screw press, comprising a main press, and a feed press in open communication therewith, each thereof including a constantly rotating material advancing screw and means for preventing rotation of the material with the screw, the main press also including a foraminous barrel, and means whereby the pressure applied to the material by the rotating screws maintains the material compressed and expels liquid from it during its travel through the press, the axes of the two screws being inclined to each other and intersecting at an obtuse angle at a point within the main press barrel, whereby a component of the material advancing and compressing force of the feed press screw supplements the like force of the main press screw.

3. A continuous screw press, comprising feed hopper, feed press and main press elements connected in tandem and in open communication with each other in the order named, each of said elements including a foraminous barrel and a constantly rotating material advancing and compressing screw therein, means whereby the pressure applied to the material by the rotating screws maintains it under compression and expels liquid from it during its travel through the press, and the axes of two succeeding press elements being inclined to each other and intersecting at an obtuse angle, whereby a component of the material advancing and compressing force of the screw operating in the leading one of said two elements supplements the like force of the screw operating in the following one of said two elements.

RAYMOND T. ANDERSON.